(12) United States Patent
Isomichi et al.

(10) Patent No.: US 6,680,876 B2
(45) Date of Patent: Jan. 20, 2004

(54) NATATOR IN WATER TANK, CONTROLLING APPARATUS AND POSITION MEASURING APPARATUS THEREON

(75) Inventors: Kanji Isomichi, Nagoya (JP); Yuuzi Terada, Kobe (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 139 days.

(21) Appl. No.: 09/924,479

(22) Filed: Aug. 9, 2001

(65) Prior Publication Data

US 2002/0036953 A1 Mar. 28, 2002

(30) Foreign Application Priority Data

Aug. 10, 2000 (JP) .......................... 2000-242845

(51) Int. Cl.[7] .............. G01S 3/80; G01S 5/30; G01S 11/16; A63H 23/10
(52) U.S. Cl. ...................... 367/128; 367/133
(58) Field of Search ................. 367/128, 133, 367/907, 129; 342/22; 340/825.49, 825.69

(56) References Cited

U.S. PATENT DOCUMENTS 4,313,183 A * 1/1982 Saylors ................. 367/128
4,751,689 A * 6/1988 Kobayashi ............. 367/128
H1132 H * 1/1993 Hellyar et al. ......... 367/128
6,141,293 A * 10/2000 Amorai-Moriya et al. .. 367/127
6,327,219 B1 * 12/2001 Zhang et al. ........... 367/128

FOREIGN PATENT DOCUMENTS

GB 2254568 A * 10/1992 .......... A63H/23/00
JP 57107643 A * 7/1982 ................ 367/132

* cited by examiner

Primary Examiner—Ian J. Lobo
(74) Attorney, Agent, or Firm—Oblon, Spivak, McClelland, Maier & Neustadt, P.C.

(57) ABSTRACT

A radio wave transmitter transmits a transmission command to an artificial fish in a water tank. A radio wave receiver in the artificial fish outputs the received transmission command to an ultrasonic transmitter so that the ultrasonic transmitter is caused to transmit ultrasonic transmission pulses. The ultrasonic transmission pulses are received by reception devices in the water tank, and a reception signal thereof is supplied to a propagation time clock generator. The propagation time clock generator generates propagation time clock pulses according to ultrasonic propagation times from the artificial fish to the reception devices. The propagation time clock pulses are counted by a pulse counter, and a count value thereof is inputted to an arithmetic operation control portion to obtain a propagation time, thereby calculating a three-dimensional position of the artificial fish.

16 Claims, 10 Drawing Sheets

| t1 (Milli-second) | t2 (Milli-second) | t3 (Milli-second) | x (m) | y (m) | z (m) |
|---|---|---|---|---|---|
| 0.68 | 1.08 | 0.666 | 1.0101 | 0.114258 | 0.083924 |
| 0.68 | 1.093 | 0.66 | 1.015075 | 0.092564 | 0.038141 |
| 0.68 | 1.093 | 0.666 | 1.0101 | 0.095436 | 0.104833 |
| 0.68 | 1.106 | 0.66 | 1.015075 | 0.073511 | 0.067962 |
| 0.68 | 1.106 | 0.666 | 1.0101 | 0.076383 | 0.11943 |
| 0.68 | 1.12 | 0.66 | 1.015075 | 0.054228 | 0.084155 |
| 0.68 | 1.12 | 0.666 | 1.0101 | 0.0571 | 0.12976 |
| ⋮ | ⋮ | ⋮ | ⋮ | ⋮ | ⋮ |
| 0.693 | 1.026 | 0.666 | 1.0204 | 0.193181 | 0.055361 |
| 0.693 | 1.04 | 0.66 | 1.025375 | 0.172411 | 0.02192 |
| 0.693 | 1.04 | 0.666 | 1.0204 | 0.175284 | 0.098283 |
| 0.693 | 1.053 | 0.66 | 1.025375 | 0.154282 | 0.080019 |
| 0.693 | 1.053 | 0.666 | 1.0204 | 0.157155 | 0.125245 |
| 0.693 | 1.066 | 0.653 | 1.0303 | 0.133079 | 0.048701 |
| 0.693 | 1.066 | 0.66 | 1.025375 | 0.135923 | 0.10831 |
| 0.693 | 1.066 | 0.666 | 1.0204 | 0.138795 | 0.145326 |
| 0.693 | 1.08 | 0.653 | 1.0303 | 0.114489 | 0.083512 |
| 0.693 | 1.08 | 0.66 | 1.025375 | 0.117332 | 0.128216 |
| ⋮ | ⋮ | ⋮ | ⋮ | ⋮ | ⋮ |

NATATOR IN WATER TANK, CONTROLLING APPARATUS AND POSITION MEASURING APPARATUS THEREON

CROSS-REFERENCE TO RELATED APPLICATIONS

This application is based upon and claims the benefit of priority from the prior Japanese Patent Application No. 2000-242845, filed Aug. 10, 2000, the entire contents of which are incorporated herein by reference.

BACKGROUND OF THE INVENTION

1. Field of the Invention

The present invention relates to a natator in a water tank such as an artificial fish which swims in a water tank of, for example, an aquarium, a controlling apparatus and a position measuring apparatus of this natator in a water tank.

2. Description of the Related Art

In recent years, as a natator in a water tank, there has been considered an artificial fish which is caused to swim in a water tank of, for example, an aquarium. The artificial fish includes therein a battery, a motor, and a control portion and the like for driving and controlling this motor, and is caused to swim in a water tank by moving a fin and others by the motor in accordance with a control command. The control of realistic movements of the artificial fish in water or three-dimensional position measurement in water for guiding the built-in battery to a non-contact charging mechanism portion is essential.

Although there has conventionally been a liquid level meter (two-dimensional) in a tank which utilizes supersonic waves to measure a propagation time thereof and further measure a liquid level or a liquid current meter for measuring a speed of a liquid flowing in a pipe, the position measuring apparatus for measuring a three-dimensional position of a natator in a water tank is not yet to come into practical use.

BRIEF SUMMARY OF THE INVENTION

It is an object of the present invention to provide a natator in a water tank whose three-dimensional position can be measured, a control apparatus thereof, and a position measurement apparatus for measuring a three-dimensional position of the natator in a water tank.

The above-described aim can be achieved by the following invention.

That is, according to one aspect of the present invention, a natator in a water tank is comprised of: a radio wave receiver for receiving a signal by radio waves transmitted from the outside; an ultrasonic transmitter for transmitting ultrasonic waves based on the signal received by the radio wave receiver; and a natatory operation servo motor which is controlled and driven based on the signal received by the radio wave receiver.

Consequently, the natator in a water tank is driven and controlled in accordance with the signal transmitted from the outside and can transmit to the outside information concerning its own position by transmitting ultrasonic waves. Further, by providing a battery, power required for the radio wave receiver, the ultrasonic transmitter and the natatory operation servo motor is supplied.

According to a second aspect of the present invention, a control apparatus of a natator in a water tank is comprised of: a radio wave transmitter for transmitting a control command by radio waves to a natator in a water tank; a radio wave receiver which is provided in the water tank and receives radio waves transmitted from the radio wave transmitter; and a natatory operation servo motor which is driven and controlled in accordance with a control command received by the radio wave receiver.

As a result, the control apparatus of a natator in a water tank can transmit a control signal to the natator in a water tank from the outside and control drive of the natator in a water tank based on this control signal.

Furthermore, by adding an ultrasonic transmitter for transmitting ultrasonic transmission pulses by a control command received by the radio wave receiver, a reception device for receiving the ultrasonic transmission pulses transmitted from the ultrasonic transmitter, and a control portion for transmitting a control command from the radio wave transmitter based on an ultrasonic reception signal received by the reception device, a position of the natator in a water tank can be grasped and the operation of the natator in a water tank can be controlled based on the grasped position.

According to a third aspect of the present invention, a position measurement apparatus of a natator in a water tank is comprised of: a radio wave transmitter for transmitting a transmission command by radio waves to the natator in a water tank; a radio wave receiver which is provided to the natator in a water tank and receives radio waves transmitted from the radio wave transmitter; an ultrasonic transmitter for transmitting ultrasonic transmission pulses by a transmission command received by the radio wave receiver; at least three reception devices which are provided in a water tank and receive ultrasonic transmission pulses transmitted from the ultrasonic transmitter; a propagation time measurement portion for measuring ultrasonic wave propagation times from the ultrasonic transmitter to the respective reception devices based on a transmission monitor signal outputted from the radio wave transmitter and ultrasonic wave reception signals received by the respective reception devices; and a position calculation portion for calculating a three-dimensional position of the natator in a water tank from each propagation time of the ultrasonic waves measured by the propagation time measurement portion.

As a result, the propagation time of the ultrasonic waves from the natator in a water tank to each reception device can be measured by receiving the ultrasonic waves transmitted from the natator in a water tank by at least three reception devices, thereby calculating a three-dimensional position of the natator in a water tank based on each propagation time. At least three reception devices can suffice calculation of a three-dimensional position of the natator in a water tank. Therefore, if three or more reception devices are provided, the ultrasonic waves received by all the reception devices do not have to be considered, and three reception devices may be appropriately selected in accordance with a reception state so that only the ultrasonic waves received by the three selected reception devices can be considered.

Incidentally, a propagation time clock generation portion, a pulse counter, and a propagation time calculation portion may be provided instead of the propagation time measurement portion for measuring an ultrasonic propagation time in order to generate propagation time clock pulses whose number corresponds to an ultrasonic propagation time by the propagation time clock generation portion, count the propagation time clock pulses by the pulse counter, and calculate a propagation time of ultrasonic waves from the ultrasonic transmitter to each reception device based on a pulse count value.

In addition, the following method may be adopted in place of the above-described method by which a three-dimensional position of the natator in a water tank is sequentially calculated by the position calculation portion based on the propagation time of ultrasonic waves from the natator in a water tank to each reception device. That is, a three-dimensional position of the natator in a water tank is previously calculated based on the propagation time of the ultrasonic waves from the natator in a water tank to each reception device, and a data table of the ultrasonic propagation time and the three-dimensional position is created in advance. Then, a corresponding three-dimensional position is obtained from this data table based on the measured ultrasonic propagation time. By doing so, the three-dimensional position of the natator in a water tank can be also measured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

A preferred embodiment according to the present invention will now be described with reference to the accompanying drawings.

Figure 1:
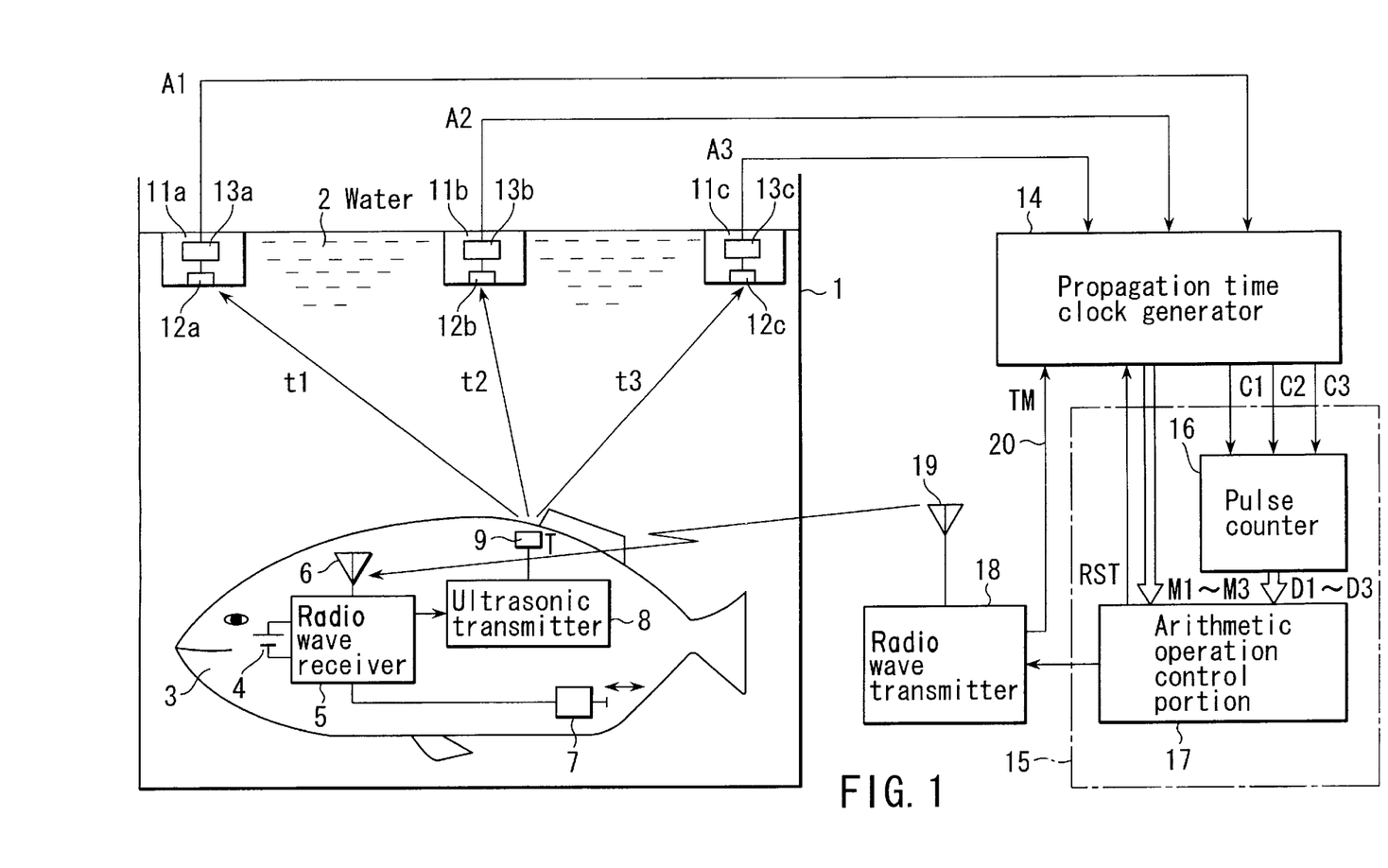
FIG. 1 is a block diagram of a position measurement apparatus of a natator in a water tank according to the present invention.

In FIG. 1, reference numeral 1 denotes a water tank. A periphery of the water tank 1 is constituted by a transparent member such as glass or acrylic, and water 2 is filled in the water tank 1. Further, for example, an artificial fish 3 as a natator is put in the water tank 1. This artificial fish 3 contains a battery 4, a radio wave receiver 5, a servo motor 7, and an ultrasonic transmitter 8. The radio wave receiver 5 receives radio waves transmitted from the outside by an antenna 6. The servo motor 7 is driven and controlled by a signal received by the radio wave receiver 5. The ultrasonic transmitter 8 transmits an ultrasonic transmission pulse T in synchronization with the signal received by the radio wave receiver 5. It is to be noted that a plurality of the servo motors 7 are provided which control natation or buoyancy of the artificial fish 3. Additionally, the ultrasonic transmitter 8 is provided with an ultrasonic oscillator 9 and transmits, for example, the ultrasonic transmission pulse T of 200 kHz from the ultrasonic oscillator 9.

Further, three reception devices 11a to 11c are fixedly provided to the water tank 1 in such a manner that they are positioned under the water and form a triangle when looking down. For example, the two reception devices 11a and 11c are arranged at the corners on one plane of the water tank 1, and the reception devices 11b is arranged at the center of the opposed plane. It is desirable to arrange the reception devices 11a, 11b and 11c in such a manner that they are provided at each 60 degrees, namely, they form an equilateral triangle when looking down in order to facilitate measurement of a position of the artificial fish 3.

The reception devices 11a to 11c are constituted by ultrasonic reception devices 12a to 12c and reception amplifiers 13a to 13c, respectively. The reception devices 11a to 11c receive the ultrasonic transmission pulses T transmitted from the ultrasonic oscillator 9 by the ultrasonic reception devices 12a to 12c, amplify the received pulses by the reception amplifiers 13a to 13c, and output ultrasonic reception signals A1 to A3. The ultrasonic reception signals A1 to A3 are transmitted to a propagation time clock generator 14 provided outside the water tank 1. As the ultrasonic oscillator 9 and the ultrasonic reception devices 12a to 12c, for example, a ceramic oscillator (zirconium titanate) is used.

The propagation time clock generator 14 generates propagation time clock pulses C1 to C3 according to propagation times t1 to t3 till the ultrasonic transmission pulses T transmitted from the ultrasonic oscillator 9 reach the reception devices 11a to 11c. It is to be noted that the further detail of the propagation time clock generator 14 will be described later.

The propagation time clock pulses C1 to C3 outputted from the propagation time clock generators 14 are transmitted to a personal computer 15. The personal computer 15 is provided with a pulse counter 16 and an arithmetic operation control portion 17. Further, when the propagation time clock pulses C1 to C3 are counted by the pulse counter 16, count values corresponding to the propagation times t1 to t3 are obtained. Then, the propagation times t1 to t3 are obtained based on the count values by the arithmetic operation control portion 17, and a three-dimensional position x, y, z of the artificial fish 3 is calculated based on the propagation times t1 to t3.

The personal computer 15 transmits a natation control command and a transmission command (position measurement start command) to the artificial fish 3 through the radio wave transmitter 18. The radio wave transmitter 18 transmits the natation control command and the transmission command supplied from the personal computer 15 to the artificial fish 3 from the antenna 19 by using radio waves of, e.g., 40 MHz, and also transmits a monitor signal TM relative to this transmission signal to the propagation time clock generator 14 through a signal line 20.

Upon detecting the transmission command from the monitor signal TM, the propagation time clock generator 14 operates in synchronization with the transmission command. Furthermore, the propagation time clock generator 14 generates the propagation time clock pulses C1 to C3 whose number corresponds to the propagation times t1 to t3 required for the ultrasonic pulses transmitted from the ultrasonic generator 8 to reach the reception devices 11a to 11c.

In the above-described structure, the personal computer 15 transmits the natation control command to the artificial fish 3 and the transmission command instructing start of the position measurement through the radio wave transmitter 18 in accordance with a preset program or an operation command from the outside. Upon receiving the natation control command transmitted from the radio wave transmitter 18, the radio wave receiver 5 contained in the artificial fish 3 drives a plurality of the servo motors 7 and causes the artificial fish 3 to swim in accordance with the natation control command. Furthermore, the radio wave receiver 5 outputs the transmission command supplied from the radio wave transmitter 18 to the ultrasonic transmitter 8. The ultrasonic transmitter 8 detects the transmission command from the transmission monitor signal and transmits the ultrasonic transmission pulses T in synchronization with the transmission command.

The ultrasonic transmission pulses T transmitted from the ultrasonic transmitter 8 are propagated with the water 2 in the water tank 1 as a medium and received by the ultrasonic reception devices 12a to 12c of the reception devices 11a to 11c. Moreover, the ultrasonic transmission pulses T received by the ultrasonic reception devices 12a to 12c are amplified by the reception amplifiers 13a to 13c and transmitted to the propagation time clock generator 14 as ultrasonic reception signals A1 to A3.

On the other hand, upon receiving the transmission monitor signal TM supplied from the radio wave transmitter 18, the propagation time clock generator 14 performs the processing for detecting whether the transmission command is included in the transmission monitor signal TM. When the propagation time clock generator 14 detects the transmission command, it generates the propagation time clock pulses C1 to C3 in synchronization with the transmission command. Furthermore, when the reception devices 11a to 11c receive the ultrasonic transmission pulses T supplied from the ultrasonic transmitter 8 and output the ultrasonic reception signals A1 to A3, the propagation time clock generator 14 stops outputting the propagation time clock pulses C1 to C3.

Therefore, the propagation time clock pulses C1 to C3 outputted from the propagation time clock generator 14 have pulse numbers according to the propagation times t1 to t3 required for the ultrasonic transmission pulses T transmitted from the ultrasonic transmitter 8 to reach the reception devices 11a to 11c.

The propagation time clock pulses C1 to C3 outputted from the propagation time clock generator 14 are counted by the pulse counter 16, and the obtained count values are outputted to the arithmetic operation control portion 17. In the arithmetic operation control portion 17, the propagation times t1 to t3 are obtained from the count values of the pulse counter 16, and a three-dimensional position (x, y, z) of the artificial fish 3 is further calculated based on the propagation times t1 to t3.

The operation principle for obtaining the three-dimensional position (x, y, z) of the artificial fish 3 will now be described with reference to FIG. 2.

Figure 2:
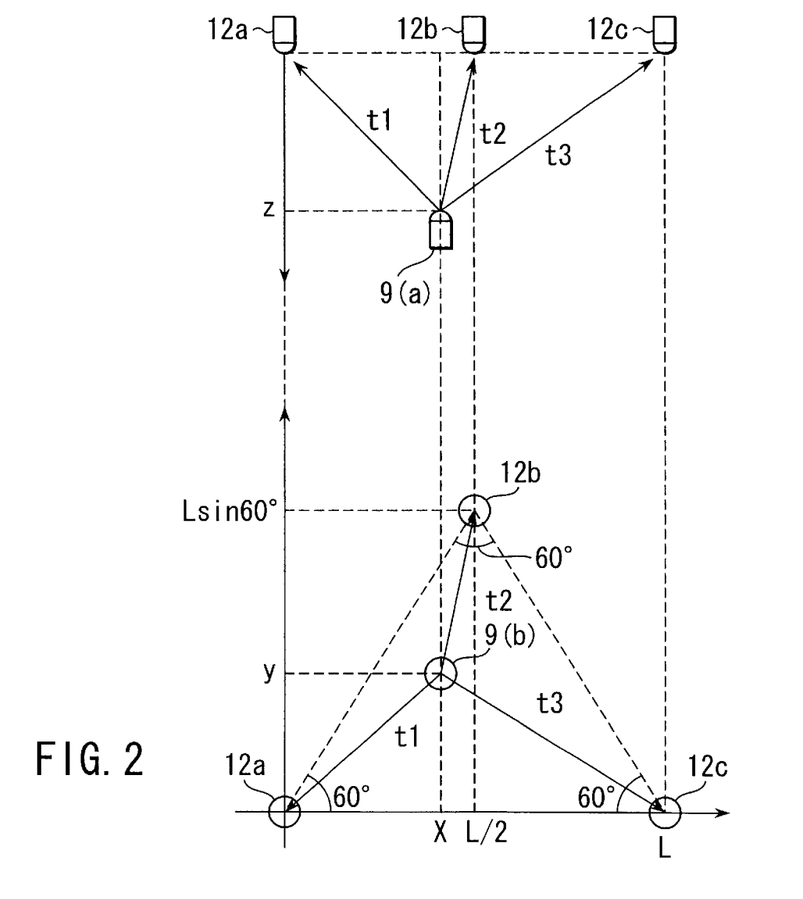
FIG. 2 is a view for illustrating a position measurement operation according to the present invention.

FIG. 2 is a view for illustrating the position measurement operation in the present invention, and depicts both a view showing the arrangement relationship between an ultrasonic oscillator 9(a) of the artificial fish 3 and ultrasonic reception devices 12a to 12c when seeing the water tank 1 from the side surface and a view showing the arrangement relationship between an ultrasonic oscillator 9(c) and the ultrasonic reception devices 12a to 12c when looking down on the water tank 1.

In this example, since the ultrasonic reception devices 12a to 12c are arranged in such a manner that they form a regular triangle when looking down, each angle formed by the respective ultrasonic reception devices 12a to 12c is 60°.

Figure 3:
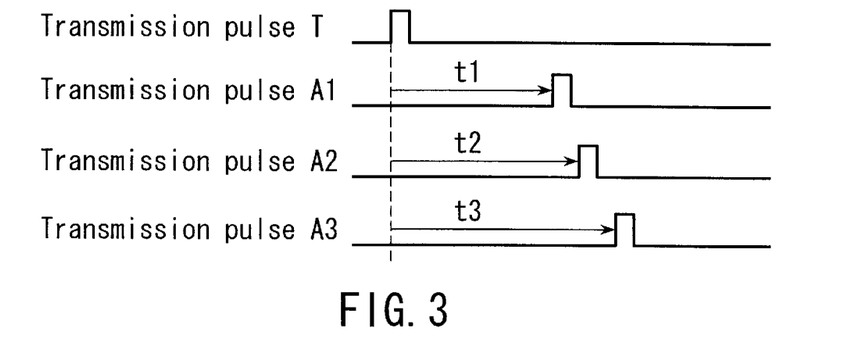
FIG. 3 is a view showing transmission timings of ultrasonic transmission pulses according to the present invention.

Reference characters t1, t2 and t3 shown in FIG. 3 denote propagation times required for the ultrasonic reception pulses T transmitted from the ultrasonic oscillator 9 to be received by the respective ultrasonic reception devices 12a to 12c and outputted as the ultrasonic reception signals A1 to A3. The following expressions (1), (2) and (3) are attained between the propagation times t1, t2 and t3 and the position x, y, z of the ultrasonic oscillator 9 (artificial fish 3). Therefore, by measuring the propagation times t1, t2 and t3 by the propagation time clock generator 14 and the personal computer 15, a position of the ultrasonic oscillator 9, i.e., a position of the artificial fish 3 can be calculated.

$$t1 = \sqrt{(x^2+y^2+z^2)/S} \qquad (1)$$

$$t2 = \sqrt{\{(L/2-x)^2+(L\sin 60°-y)^2+z^2\}/S} \qquad (2)$$

$$t3 = \sqrt{\{(L-x)^2+y^2+z^2\}/S} \qquad (3)$$

where, S: a sonic speed in water (1483 m/s (0° C., 1 atm))

Figure 4:
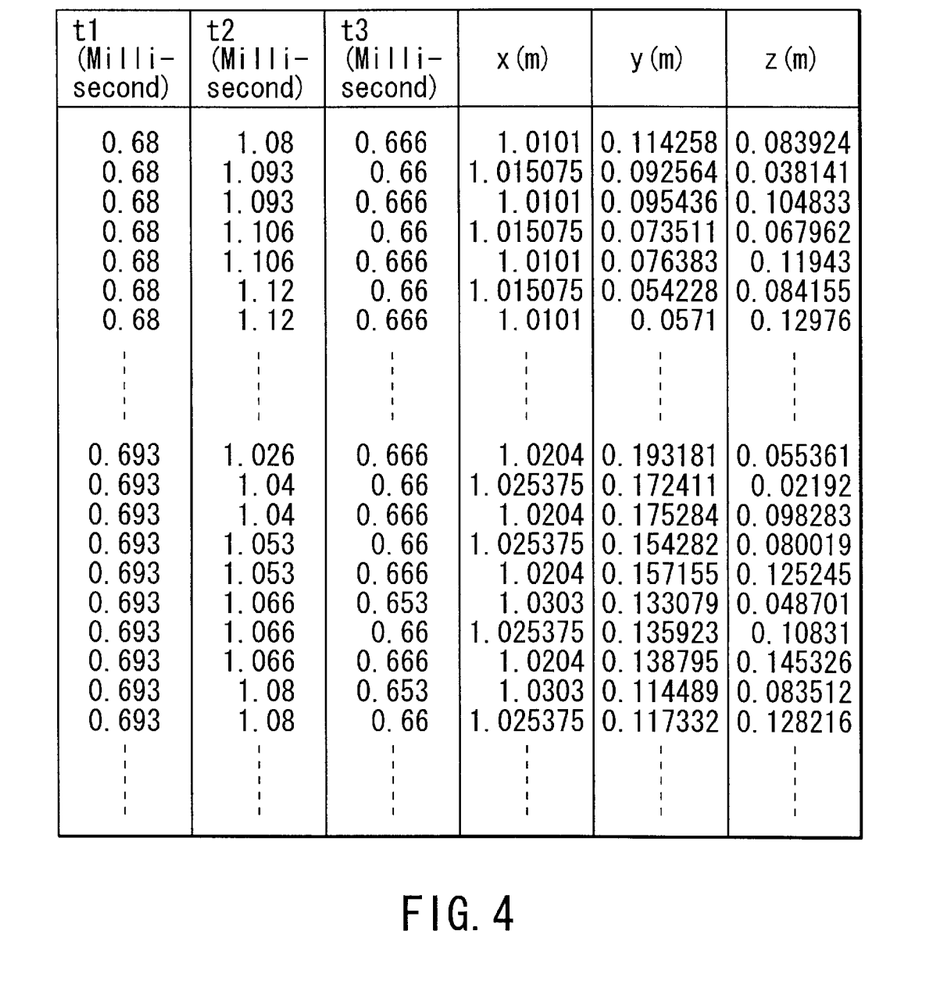
FIG. 4 is a view showing an example of a data table for easily obtaining a three-dimensional position of a natator from a propagation time of ultrasonic pulses according to the present invention.

L: each distance between the respective ultrasonic reception devices 12a, 12 and 12c The above has described the example in which the three-dimensional position x, y, z of the artificial fish 3 is calculated each time by using the expressions (1), (2) and (3). However, as shown in FIG. 4 for example, a data table showing the relationship between the propagation times t1, t2 and t3 and the three-dimensional position x, y, z of the artificial fish 3 may be created in advance, and the measured propagation times t1, t2 and t3 may be compared with the data table to obtain the three-dimensional position x, y, z of the artificial fish 3. By creating the data table and storing it in the personal computer 15 in advance as described above, the three-dimensional position x, y, z of the artificial fish 3 can be rapidly obtained without performing calculation each time.

The detail of the ultrasonic transmitter 8, the reception devices 11a to 11c and the propagation time clock generator 14 will now be described with reference to FIGS. 5 and 6.

Figure 5:
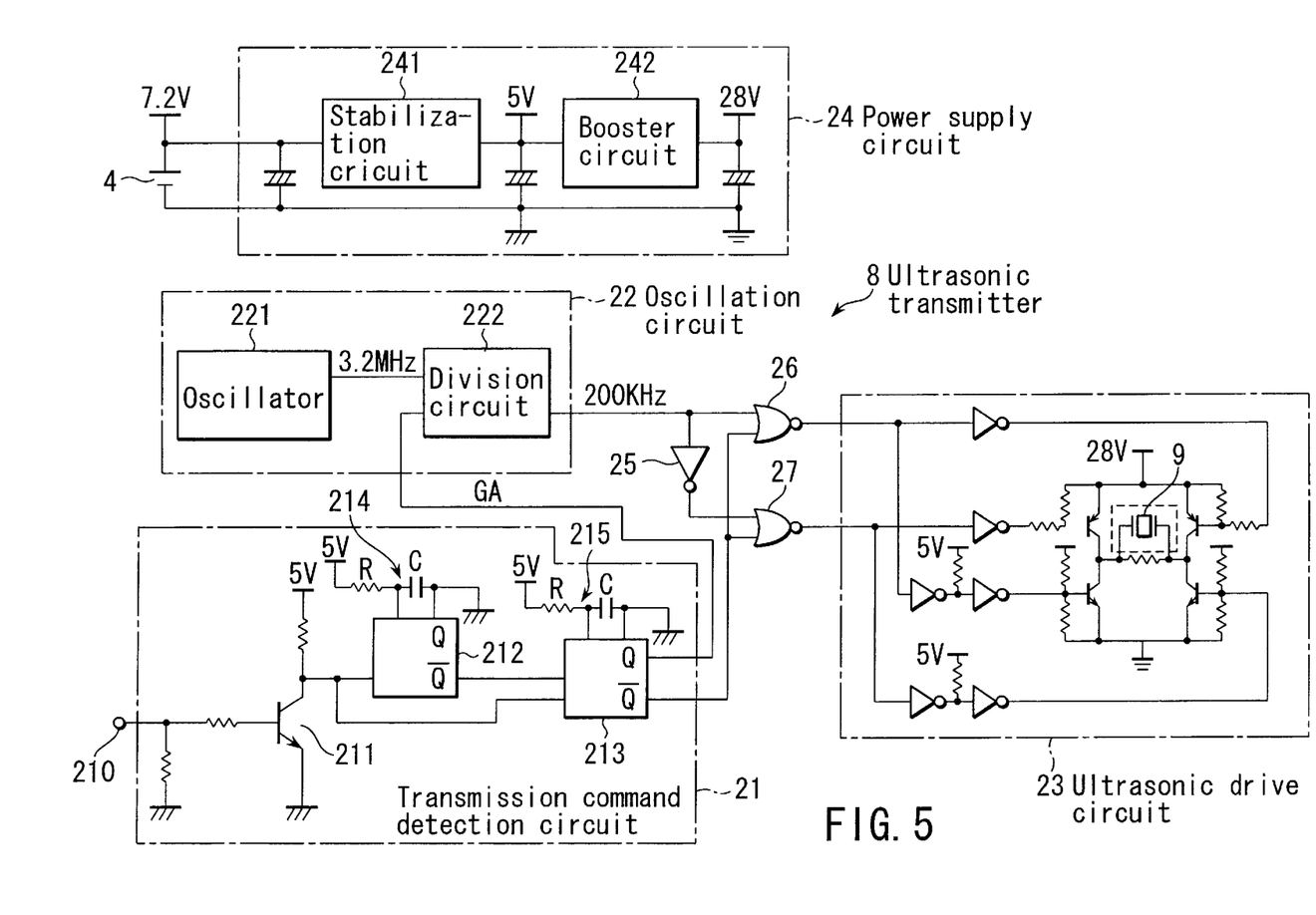
FIG. 5 is a circuit block diagram of an ultrasonic transmitter according to the present invention.

The circuit structure of the ultrasonic transmitter 8 is as shown in FIG. 5. Moreover, as to (a) a transmission control voltage and (b) a transmission monitor signal TM1 in FIG. 6, the timing chart on the radio wave transmitter 18 side is shown. In addition, as to (c) a pulse width of the transmission command, (d) a transmission command identification pulse, (e) a transmission command gate signal GA, (f) an ultrasonic transmission signal, (e') a transmission command gate signal GA, and (f') an ultrasonic transmission pulse 2(T) in FIG. 6, a timing chart on the ultrasonic transmitter 8 side is shown.

As shown in FIG. 5, the ultrasonic transmitter 8 is constituted by a transmission command detection circuit 21, an oscillation circuit 22, an ultrasonic drive circuit 23, and a power supply circuit 24.

The transmission command detection circuit 21 detects the transmission command from the transmission monitor signal TM1 received by the radio wave receiver 5. The oscillation circuit 22 outputs a signal of, e.g., 200 kHz for a predetermined time in synchronization with the transmission command detected by the transmission command detection circuit 21. The ultrasonic drive circuit 23 drives the ultrasonic oscillator 9 by an output from the oscillation circuit 22, and outputs the ultrasonic transmission pulse T. The power supply circuit 24 supplies operating power to these respective circuits.

Figure 6:
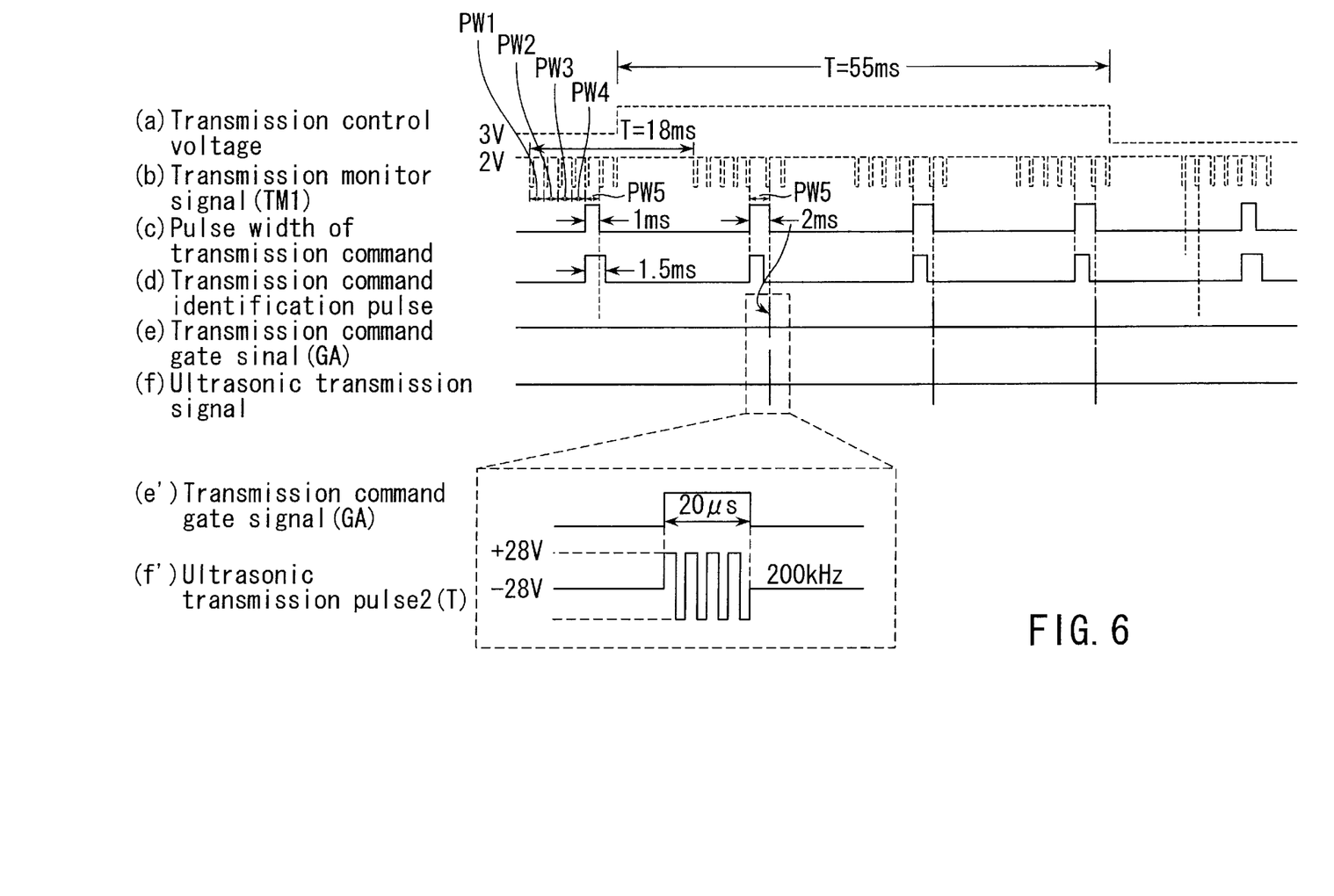
FIG. 6 is a timing chart for illustrating an operation of the ultrasonic transmitter according to the present invention.

As indicated by (b) the transmission monitor signal in FIG. 6, the radio wave transmitter 18 transmits the transmission monitor signal TM1 to the radio wave receiver 5, for example, every 18 ms. The transmission monitor signal TM1 has, for example, first to fifth control channels, and uses the first to fourth channels Pw1 to Pw4 for controlling natation or controlling buoyancy of the artificial fish 3 and the fifth channel Pw5 for the transmission command. Moreover, the radio wave transmitter 18 asynchronously generates a transmission control voltage having a time width indicated by (a) the transmission control voltage being approximately 55 ms every several tens of ms. The time width of the fifth channel Pw5 is usually set to 1 ms, but it is set to 2 ms when (a) the transmission control voltage has risen to the "H" level. The transmission command becomes significant when the time width of the fifth channel Pw5 is 2 ms.

Upon receiving the transmission monitor signal TM1 from the radio wave transmitter 18, the radio wave receiver 5 drives the servo motors 7 with signals of the first to fourth channels Pw1 to Pw4 and carries out the natation control or the buoyancy control of the artificial fish 3. In addition, the radio wave receiver 5 outputs a signal of the fifth channel Pw5 to the transmission command detection circuit 21.

The transmission command detection circuit 21 consists of a level conversion circuit 211, an identification pulse generation circuit 212, and a transmission command identification portion 213. The level conversion circuit 211 is constituted by, for example, an NPN type transistor. As indicated by (c) the pulse width of the transmission command shown in FIG. 6, the level conversion circuit 211 converts a signal of the fifth channel Pw5 inputted from the radio wave receiver 5 to the terminal 210 into a predetermined signal level, and inputs the obtained result into the identification pulse generation circuit 212 and the transmission command identification portion 213. The identification pulse generation circuit 212 is constituted by using, for example, a flip flop circuit. The identification pulse generation circuit 212 is provided with a time constant circuit 214 consisting of a resistor R and a capacitor C. Further, the identification pulse generation circuit 212 generates a transmission command identification pulse of, e.g., 1.5 ms in synchronization with the signal of the fifth channel Pw5 inputted from the level conversion circuit 211 as indicated by (d) the transmission command identification pulse of FIG. 6, and inputs the generated pulse into the transmission command identification portion 213.

The transmission command identification portion 213 is constituted by, e.g., a flip flop circuit, and provided with a time constant circuit 215 consisting of a resistor R and a capacitor C. The transmission command identification portion 213 compares the signal of the fifth channel Pw5 with (d) the transmission command identification pulse. If the signal width of the fifth channel Pw5 is longer than (d) the transmission command identification pulse, that is, if the signal width of the fifth channel Pw5 is 2 ms, it is determined that the transmission command is supplied from the radio wave transmitter 18, and the transmission command gate signal GA (for example, the width of 20 μs) is outputted in synchronization with the trailing edge of the transmission command as indicated by (e) the transmission command gate signal GA and (e') the transmission command gate signal GA. In this case, a signal outputted from the output terminal on the Q side of the transmission command identification portion 213 is transmitted to the oscillation circuit 22 as the transmission command gate signal GA. Further, the signal outputted from the output terminal on the/Q side (inversion output terminal of Q) of the transmission command identification portion 213 is inputted to NOR gates 26 and 27 provided on the output side of the oscillation circuit 22.

The oscillation circuit 22 is constituted by an oscillator 221 of, e.g., 3.2 MHz and a division circuit 222 for dividing a signal of 3.2 MHz outputted from this oscillator 221 into signals of 200 kHz. In the oscillation circuit 22, the transmission command gate signal GA supplied from the oscillation command identification portion 213 is inputted to the division circuit 222. The division circuit 222 usually stops outputting the signal, and outputs the signal of 200 kHz only when the oscillation command gate signal GA having the 20 μs width indicated by (e') the oscillation command gate signal GA in FIG. 6 is supplied from the oscillation command identification portion 213.

The signal of 200 kHz outputted from the oscillation circuit 22 is inputted to the NOR gate 26. Further, the phase of this signal is inverted by the inverter 25 so that the signal is inputted to the NOR gate 27. The NOR gates 26 and 27 open the gates by the signal supplied from the/Q side terminal of the oscillation command identification portion 213 only when the transmission command gate signal GA is outputted from the transmission command detection circuit 21, and output the signal of 200 kHz outputted from the oscillation circuit 22 and the signal whose phase has been inverted by the inverter 25 to the ultrasonic drive circuit 23. This ultrasonic drive circuit 23 performs the push-pull drive with respect to the ultrasonic oscillator 9 by the signals inputted through the NOR gates 26 and 27, and generates the ultrasonic transmission pulse T of 200 kHz for a period of 20 μs as indicated by (f) the ultrasonic transmission signal and (f') the ultrasonic transmission pulse in FIG. 6. The ultrasonic signal transmitted from the ultrasonic oscillator 9 is propagated through the water 2 in the water tank 1 and received by the ultrasonic reception devices 12a to 12c of the reception devices 11a to 11c.

Furthermore, the power supply circuit 24 in FIG. 5 is composed of a stabilization circuit 241 for stabilizing an output voltage of a battery 4 and a booster circuit 242 for boosting a voltage stabilized by the stabilization circuit 241. The stabilization circuit 241 lowers a voltage of, e.g., 7.2 V outputted from the battery 4 to a voltage of 5 V for stabilization, and supplies the resulting voltage to the transmission command detection circuit 21, the oscillation circuit 22 and the ultrasonic drive circuit 23 as an operating voltage. Moreover, the booster circuit 242 boosts the voltage of 5 V stabilized by the stabilization circuit 241 to a voltage of, e.g., 28 V and supplies it to the ultrasonic drive circuit 23 as a driving voltage of the ultrasonic oscillator 9.

The reception devices 11a to 11c are constituted by the ultrasonic reception devices 12a to 12c and the reception amplifiers 13a to 13c. The ultrasonic reception devices 12a to 12c receive the ultrasonic transmission pulses T transmitted from the ultrasonic transmitter 8. The reception amplifiers 13a to 13c amplify signals received by the ultrasonic reception devices 12a to 12c. The ultrasonic reception devices 12a to 12c receive the ultrasonic waves transmitted from the ultrasonic transmitter 8, convert them into electrical signals and input them to the reception amplifiers 13a to 13c.

Figure 7:
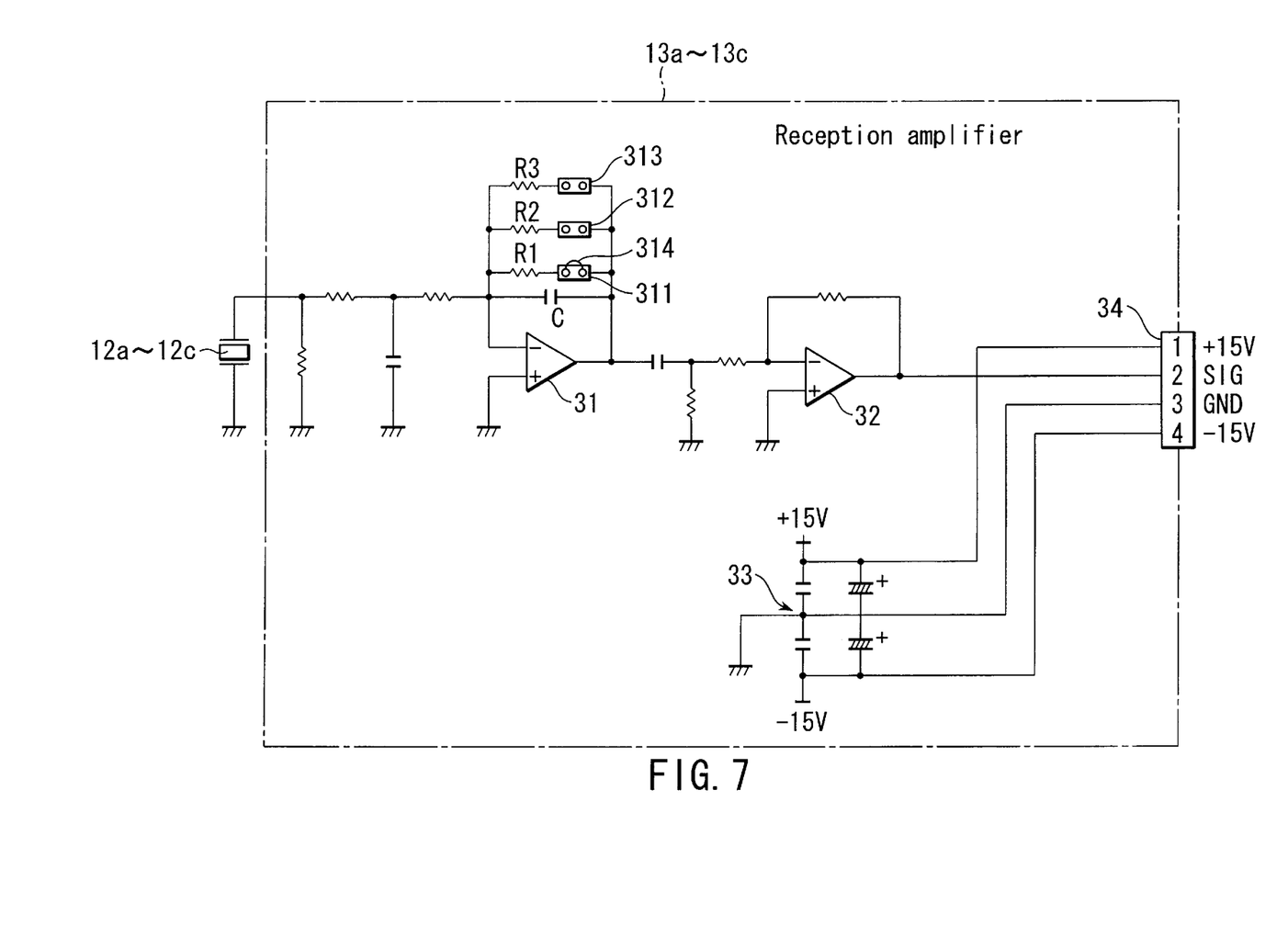
FIG. 7 is a block diagram showing the detail of a reception amplifier according to the present invention.

As shown in FIG. 7, the reception amplifiers 13a to 13c are constituted by two arithmetic operation amplifiers 31 and 32 for amplifying the electrical signals of the ultrasonic waves converted by the ultrasonic reception devices 12a to 12c, a power supply portion 33, and an external connection terminal 34. A capacitor C for negative feedback and a plurality of, e.g., three resistors R1 to R3 having different values are connected in parallel between the negative input terminal and the output terminal of the arithmetic operation amplifier 31 through switching terminals 311 to 313. When the input and output terminals of the switching terminals 311 to 313 are short-circuit-connected by a jumper line 314, the connection of the negative feedback resistors R1 to R3 is switched and a degree of amplification of the arithmetic operation amplifier 31 can be arbitrarily set. FIG. 7 shows the state in which the input and output terminals of the switching terminal 311 are short-circuit-connected by the jumper line 314 and the negative feedback resistor R1 is selected.

The signals amplified by the arithmetic operation amplifiers 31 and 32 are transmitted to the propagation time clock generator 14 by the external connection terminal 34 as the ultrasonic reception signals A1 to A3. Moreover, a direct-current voltage of, e.g., ±15 V is supplied from the propagation time clock generator 14 to the external connection terminal 34. The power supply portion 33 stabilizes the direct-current voltage of ±15 V by the capacitor and supplies it to the arithmetic operation amplifiers 31 and 32 as the operating power.

Figure 8:
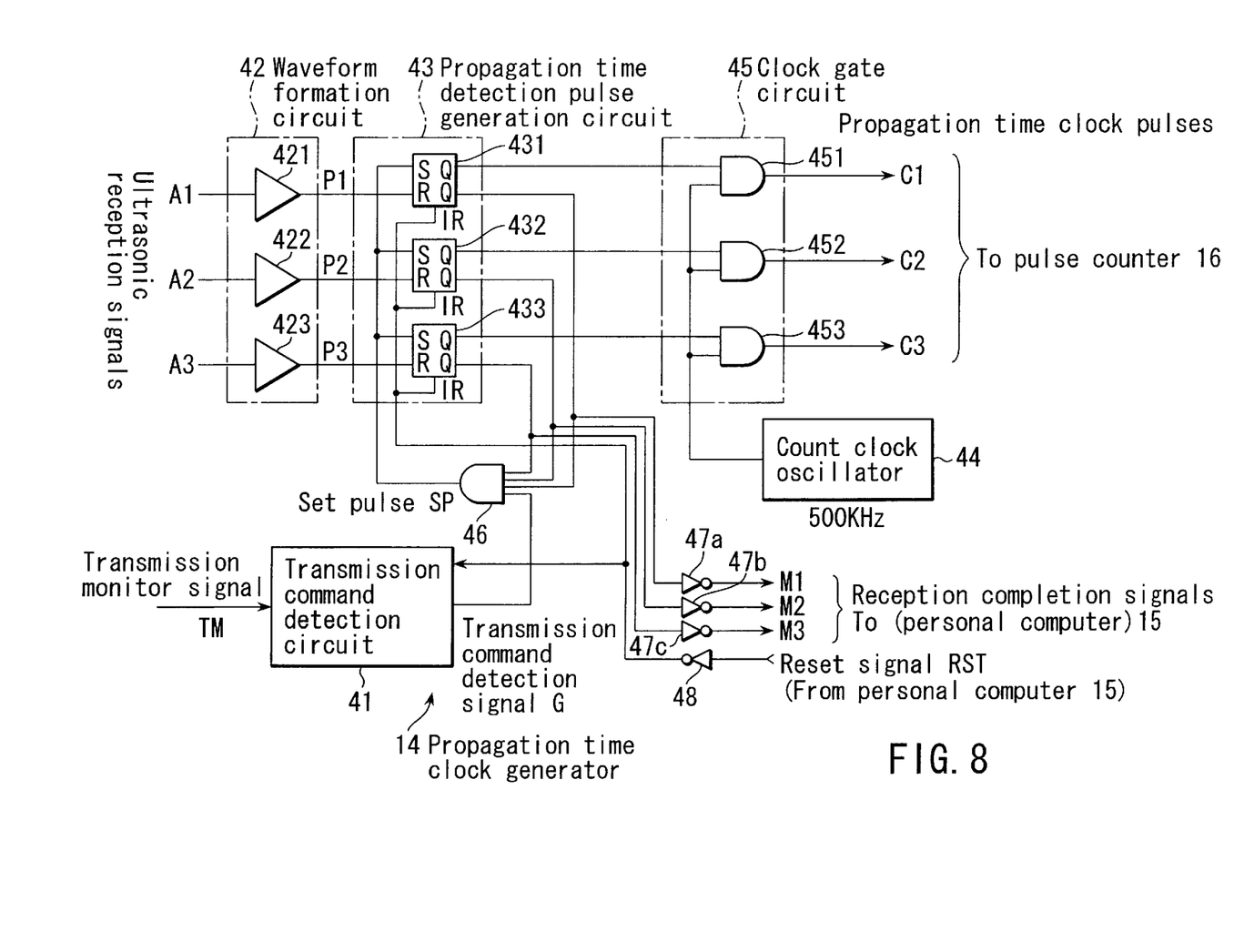
FIG. 8 is a circuit block diagram showing the detail of a propagation time clock generator according to the present invention.

As shown in FIG. 8, the propagation time clock generator 14 is constituted by a transmission command detection circuit 41, a waveform formation circuit 42, a propagation time detection pulse generation circuit 43, a count clock oscillator 44, and a clock gate circuit 45. The transmission command detection circuit 41 detects the transmission command in a wireless transmission monitor signal TM supplied from the radio wave transmitter 18. The waveform formation circuit 42 forms waveforms of the ultrasonic reception signals A1 to A3 received by the reception devices 11a to 11c. The propagation time detection pulse generation circuit 43 generates propagation time detection pulses based on the ultrasonic reception pulses P1 to P3 whose waveforms have been formed by the waveform formation circuit 42 and the transmission command detected by the transmission command detection circuit 41. The count clock oscillator 44 outputs a count clock of, e.g., 500 kHz. The count clocks which are gate-controlled by the propagation time detection pulse outputted from the propagation time detection pulse generation circuit 43 and are outputted from the count clock oscillator 44 are outputted to pulse counter 16 by the clock gate circuit 45 as propagation time clock pulses C1 to C3.

Figure 9:
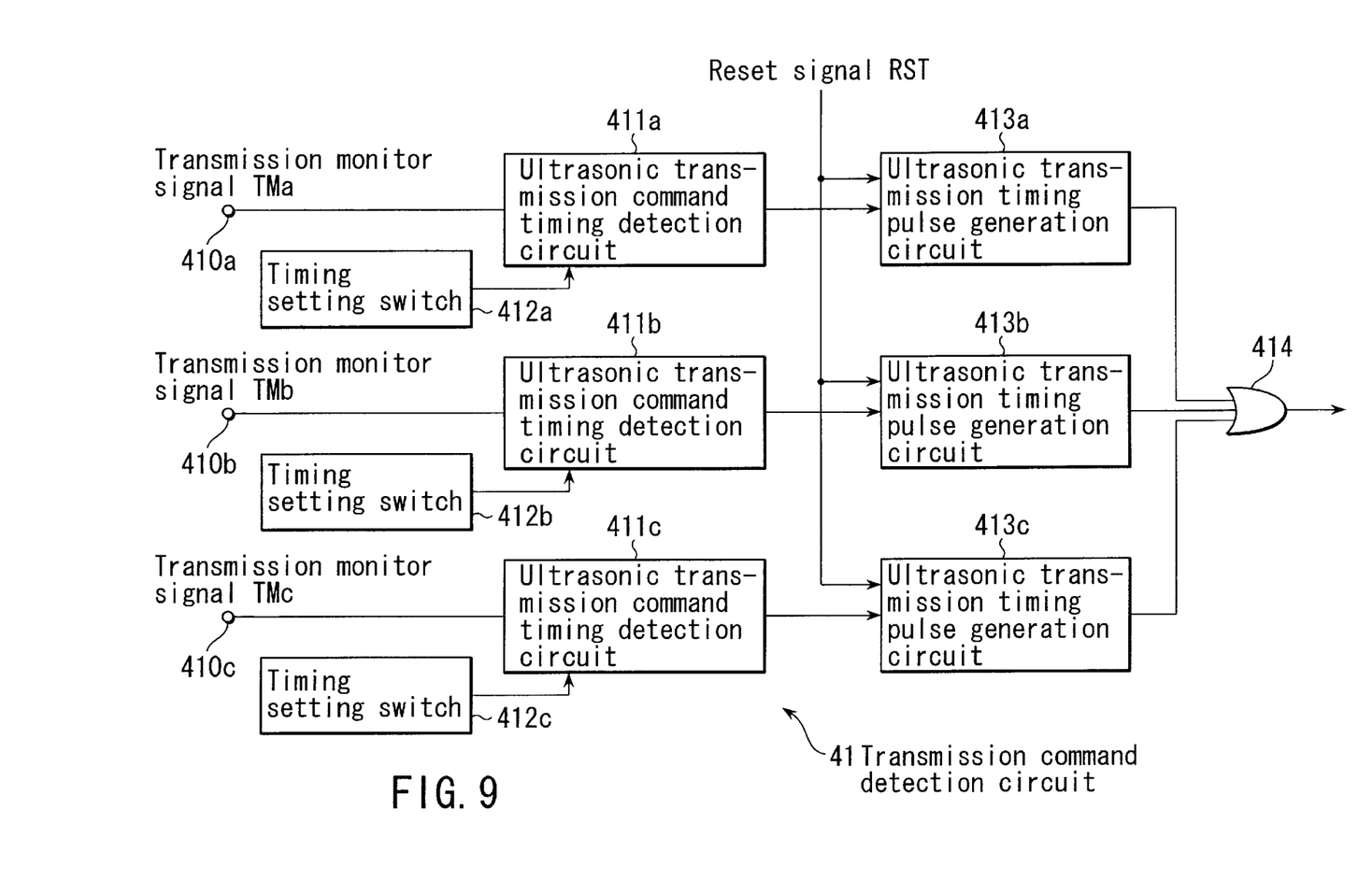
FIG. 9 is a block diagram showing the detail of a transmitted command detection circuit.

The oscillation detection circuit 41 is constituted as shown in FIG. 9. FIG. 9 shows an example in which a plurality of, e.g., three artificial fishes 3 are swimming in the water tank 1. Here, the transmission command detection circuit 41 is constituted by ultrasonic transmission command timing detection circuits 411a to 411c, timing setting switches 412a to 412c, ultrasonic transmission timing pulse generation circuits 413a to 413c, and an OR circuit 414.

Transmission monitor signals TMa to TMc relative to the respective artificial fishes 3, which are supplied from the radio wave transmitter 18, are inputted to the ultrasonic transmission command timing detection circuits 411a to 411c through the input terminals 410a to 410c. The timing setting switches 412a to 412c set the timings for detecting the transmission commands of the ultrasonic transmission command timing detection circuits 411a to 411c. The ultrasonic transmission command timing detection circuits 411a to 411c detects the transmission commands having the signal width of 2 ms from the wireless transmission monitor signals TMa to TMc in a similar fashion to that of the transmission command detection circuit 21 in the ultrasonic transmitter 8 shown in FIG. 5, and output the detected commands to the ultrasonic transmission timing pulse generation circuits 413a to 413c.

The ultrasonic transmission timing pulse generation circuits 413a to 413c are initialized by a reset signal RST supplied from the personal computer 15 through the inverter 48. After being initialized by the reset signal RST, the ultrasonic transmission timing pulse generation circuits 413a to 413c output a transmission command detection signal G in synchronization with the initially inputted transmission timing pulse. The time width of the transmission command detection signal G is set to, for example, 70 μs in order to eliminate the influence of noise and the like, and this transmission command detection signal G is inputted to an AND circuit 46 through an OR circuit 414. However, the ultrasonic transmission timing pulse generation circuits 413a to 413c prohibit output of the transmission command detection signal G even if the transmission timing pulse is thereafter inputted.

Moreover, as shown in FIG. 8, the waveform formation circuit 42 forms the waveforms of the ultrasonic reception signals A1 to A3 received by the reception devices 11a to 11c by using waveform formation amplifiers 421 to 423 and inputs the obtained results to the propagation time detection pulse generation circuit 43. The propagation time detection pulse generation circuit 43 is constituted by, for example, flip flop circuits 431 to 433. Signals outputted from the/Q side output terminal (inversion output terminal for an output on the Q side) are inputted to the AND circuit 46, taken out through the inverters 47a to 47c and supplied to the arithmetic operation control portion 17 of the personal computer 15 as reception completion signals M1 to M3. Upon receiving the reception completion signals M1 to M3, the arithmetic operation control portion 17 outputs initial reset signals RST to the propagation time clock generator 14. The initial reset signals RST are inputted to initial reset terminals IR of the flip flop circuits 431 to 433 through the inverter 48. The transmission command detected by the transmission command detection circuit 41 as described above is inputted to the AND circuit 46, and output signals of the AND circuit 46 are inputted to set terminals S of the flip flop circuits 431 to 433 as set pulses SP.

Then, signals outputted from the Q side output terminals of the flip flop circuits 431 to 433 are supplied to the clock gate circuit 45. This clock gate circuit 45 is constituted by, for example, AND circuits 451 to 453, and output signals of the flip flop circuits 431 to 433 and the count clocks from the count clock oscillator 44 are inputted to the respective AND circuits 451 to 453. The AND circuits 451 to 453 open the gates when the propagation time detection pulses are being supplied from the flip flop circuits 431 to 433, and output the count clocks from the count clock oscillator 44 as the propagation time clock pulses C1 to C3.

Figure 10:
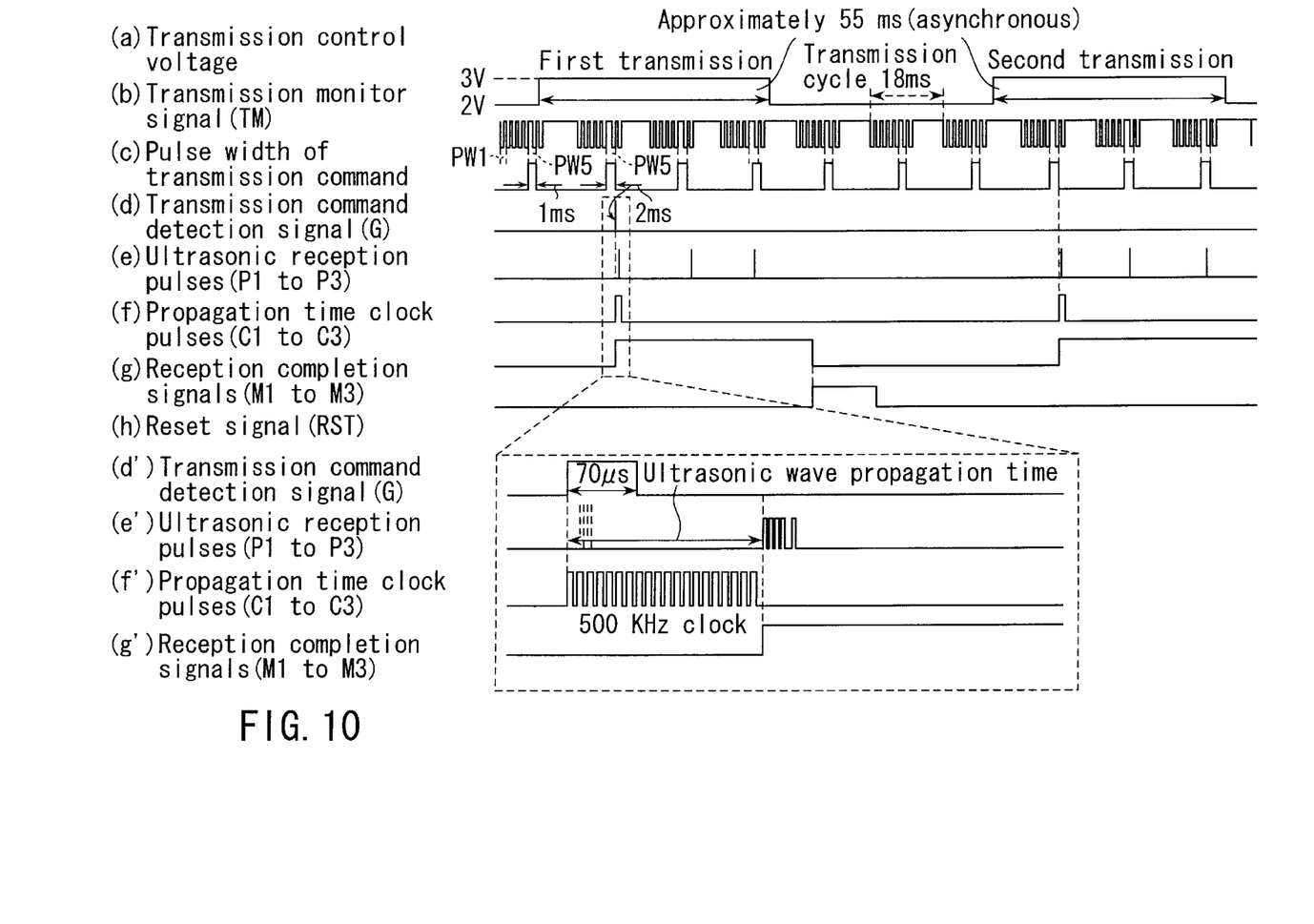
FIG. 10 is a timing chart for illustrating an operation of the propagation time clock generator.

To the propagation time clock generator 14 constituted as described above is inputted through a signal line a transmission monitor signal TM which is the same as a wireless signal supplied from the radio wave transmitter 18 to the artificial fish 3 as indicated by (b) the transmission monitor signal TM in FIG. 10. This transmission monitor signal TM has the first to fifth control channels Pw1 to Pw5 as described above, and the fifth channel Pw5 is used for transmission commands. In addition, the radio wave transmitter 18 asynchronously generates a transmission control voltage having a time width of approximately 55 ms every several tens of ms as indicated by (a) the transmission control voltage in FIG. 10 in order to measure a position of the artificial fish 3. Although the time width of the fifth channel Pw5 is usually set to 1 ms as indicated by the pulse width of (c) the transmission command in FIG. 10, it is set to 2 ms when the transmission control voltage is on the "H" level.

When the transmission monitor signal TM is supplied from the radio wave transmitter 18, the propagation time clock generator 14 detects the transmission command by the transmission command detection circuit 41. That is, the transmission command detection circuit 41 generates an identification pulse having the time width of 1.5 ms in a similar fashion to that of the transmission command detection circuit 21 in the ultrasonic transmitter 8, compares the identification pulse with the time width of the fifth channel Pw5, and detects the transmission command having the time width of 2 ms. Upon detecting the transmission command, the transmission command detection circuit 41 outputs to the AND circuit 46 a transmission command detection signal G having the time width of, e.g., 70 μs during its fall time as indicated by (d) the transmission command detection signal G and (d') the transmission command detection signal G in FIG. 10.

On the other hand, after outputting the reception completion signals M1 to M3 to the personal computer 15, the propagation time detection pulse generation circuit 43 is reset by the initial reset signal RST supplied from the personal computer 15, and a signal "1" is outputted from its/Q side output terminal to the AND circuit 46. Therefore, when the transmission command detection signal G is outputted from the transmission command detection circuit 41, the logical condition of the AND circuit 46 is attained. As a result, the transmission command detection signal G is outputted as the set pulse SP without any change, and the flip flop circuits 431 to 433 of the propagation time detection pulse generation circuit 43 are set. Consequently, the Q side outputs of the flip flop circuits 431 to 433 become "1", and the gates of the AND circuits 451 to 453 of the clock gate circuit 45 are opened. Additionally, the count clocks from the count clock oscillator 44 are outputted through the AND circuits 451 to 453. The count clocks outputted from the AND circuits 451 to 453 are supplied to the pulse counter 16 as the propagation time clock pulses C1 to C3 as indicated by (f) and (f') in FIG. 10. As a result, the counting operation of the pulse counter 16 starts.

On the other hand, in the ultrasonic transmitter 8 shown in FIG. 5, the transmission command detection circuit 21 detects the transmission command from the radio wave transmitter 18 with the same timing as that of the transmission command detection circuit 41, drives the ultrasonic oscillator 9 by the ultrasonic drive circuit 23, and transmits the ultrasonic transmission pulses T.

The ultrasonic transmission pulses T from the ultrasonic oscillator 9 are propagated through the water 2 in the water tank 1 and received by the reception devices 11a to 11c behind by the times t1, t2 and t3, respectively. The reception devices 11a to 11c receive the ultrasonic transmission pulses T from the ultrasonic oscillator 9 by the ultrasonic reception devices 12a to 12c, amplify them by the reception amplifiers 13a to 13c, and output them to the propagation time clock generator 14 as the ultrasonic reception signals A1 to A3. The propagation time clock generator 14 forms the waveform of the ultrasonic reception signals A1 to A3 by the waveform formation circuit 42 as shown in FIG. 8, and outputs them to the propagation time detection pulse generator circuit 43 as the ultrasonic reception pulses P1 to P3 as indicated by (e) and (e') in FIG. 10. In the propagation time detection pulse generator circuit 43, the flip flop circuits 431 to 433 are respectively reset by the ultrasonic reception pulses P1 to P3, and the outputs on the Q side become "0" so that the gates of the AND circuits 451 to 453 of the clock gate circuit 45 are closed.

Therefore, the transmission command is detected by the transmission command detection circuit 41 as indicated by (f) and (f') in FIG. 10, and the flip flop circuits 431 to 433 are set. Thereafter, the propagation time clock pulses C1 to C3 are outputted from the AND circuits 451 to 453 until the flip flop circuits 431 to 433 are reset by the ultrasonic reception pulses P1 to P3. The time during which the propagation time clock pulses C1 to C3 are outputted from the AND circuits 451 to 453 corresponds to the propagation times t1, t2 and t3 of the ultrasonic transmission pulses T transmitted from the ultrasonic transmitter 8.

The propagation time clock pulses C1 to C3 outputted from the clock gate circuit 45 are supplied to the pulse counter 16 of the personal counter 15 and counted. Count values D1 to D3 of these pulses are supplied to the arithmetic operation control portion 17. The arithmetic operation control portion 17 calculates the propagation time of the ultrasonic transmission pulses T based on the count values D1 to D3 of the pulse counter 16, and executes the operations of the expressions (1) to (3) to obtain the three-dimensional position x, y, z of the artificial fish 3. Alternatively, a data table showing the relationship between the propagation times t1, t2 and t3 and the three-dimensional position x, y, z of the artificial fish 3 is creased in advance as illustrated in FIG. 4, and the measured propagation times t1, t2 and t3 are compared with the data table to obtain the three-dimensional position x, y, z of the artificial fish 3.

Data of the three-dimensional position x, y, z measured as described above is used for the positional control and the guidance control of the artificial fish 3. For example, in the case of charging the battery 4, the artificial fish 3 is guided to a predetermined position where charging is carried out, and alternating power is induced on the artificial fish 3 side by radio waves at this charging position. Further, the battery 4 is charged by rectifying the induced electric power.

Furthermore, in FIG. 8, when the flip flop circuits 431 to 433 are reset by the ultrasonic reception pulses P1 to P3, the/Q side outputs are taken out through the inverters 47a to 47c and supplied to the arithmetic operation control portion 17 of the personal computer 15 as the reception completion signals M1 to M3. After the transmission control voltage indicated by (a) in FIG. 10 falls, the arithmetic operation control portion 17 outputs the reset signal RST indicated by (h) in FIG. 10 and initializes the flip flop circuits 431 to 433 of the propagation time detection pulse generation circuit 43, thereby preparing for the next position measurement.

In the example shown in the timing chart of FIG. 10, when the transmission control voltage indicated by (a) is on the "H" level, the transmission command is issued a multiple number of times, e.g., three times. The ultrasonic transmission pulses T are transmitted from the ultrasonic transmitter 8 and received by the reception devices 11a to 11c every time the transmission command is issued. However, as described above, the ultrasonic transmission timing pulse generation circuits 413a to 413c in the transmission command detection circuit 41 accept only the first transmission command and execute the measurement processing.

The position measurement cycle of the artificial fish 3 can be double (double at the lowest) the radio wave transmission cycle 18 ms from the radio wave transmitter 18.

A description will now be given as to setting of the transmission frequency of the count clock oscillator 44 in the propagation time clock generator 14.

In the case of performing the guidance control of the artificial fish 3, as to the position detection accuracy, all the three axes x, y, z must fall within 2 to 3 cm. Therefore, the propagation times t1, t2 and t3 of the ultrasonic transmission pulses T from the ultrasonic oscillator 9 to the ultrasonic reception devices 12a to 12c must be accurately measured. The position detection accuracy of the artificial fish 3 is determined by the frequency of the propagation clock pulses C1 to C3, namely, the oscillation frequency of the count clock oscillator 44, and that oscillation frequency is set as follows.

The sonic speed in water is 1483 m/s (0° C., 1 atm), and the propagation time of 1 cm is 0.674 µs. Therefore, assuming that each position detection accuracy of x, y, z is set to 3 cm, the oscillation frequency f of the count clock oscillator 44 can be expressed as follows:

$$f = 1/(0.647 \times 3) \ \mu s$$
$$= 494 \ \text{kHz}$$
$$\approx 500 \ \text{kHz}$$

Thus, when the oscillation frequency of the count clock oscillator 44 is set to 500 kHz, the position detection accuracy of not more than 3 cm can be obtained. Moreover, when the oscillation frequency of the count clock oscillator 44 is set to a high frequency of not less than 500 kHz, the position detection accuracy can be further improved.

Figure 11:
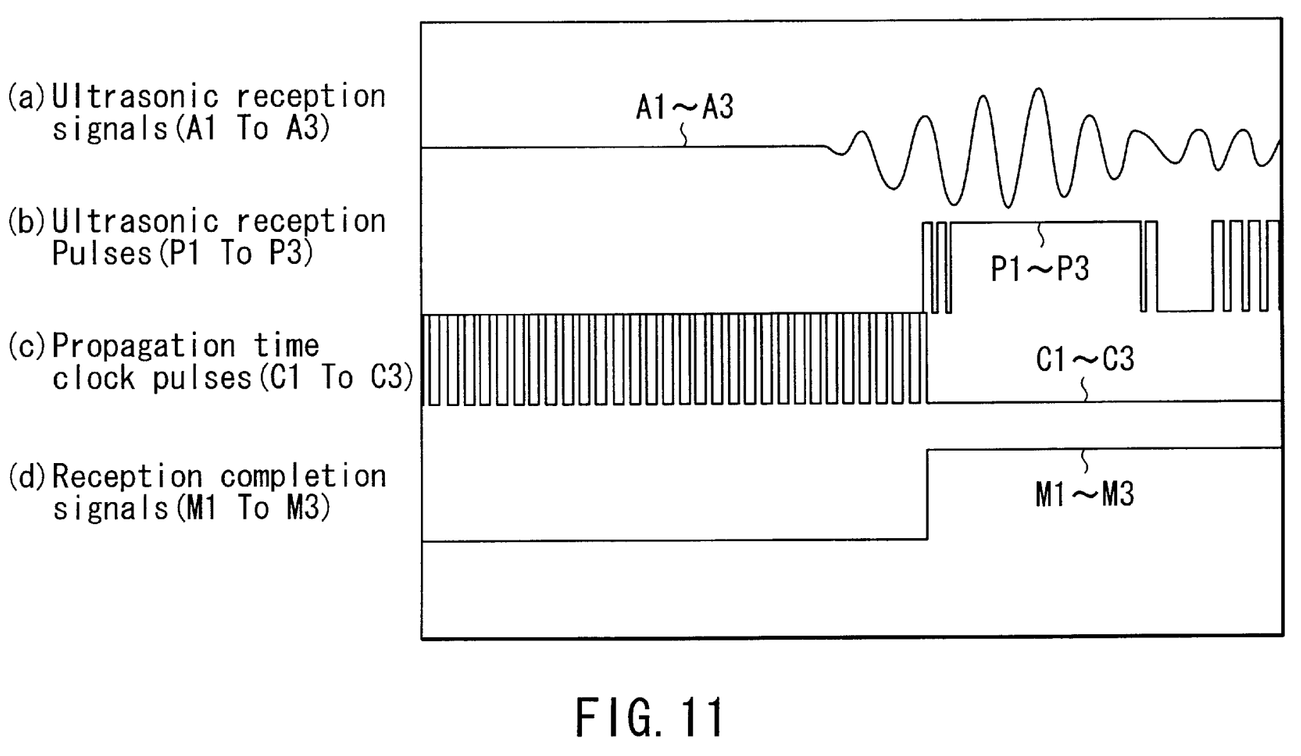
FIG. 11 is a view showing an example of observed waveforms at each part of the propagation time clock generator.

Examples of the observed waveforms of the ultrasonic reception signals A1 to A3, the ultrasonic reception pulses P1 to P3, the propagation time clock pulses C1 to C3, and the reception completion signals M1 to M3 are as shown in the timing chart of FIG. 11.

Incidentally, although the above embodiment has described the case where the radio wave transmitter 18 uses the radio waves in the 40 MHz band, a frequency band which is hardly attenuated in water, for example, a frequency band of several MHz to 100 MHz can be used. Moreover, the oscillation frequency of the ultrasonic transmitter 8 is not restricted to 200 kHz, and it is needless to say that any other frequency can be used.

In addition, although the above embodiment has described the case where the reception devices 11a to 11c are provided under the water in the water tank 1, the measurement processing can be similarly carried out even if the reception devices 11a to 11c are provided on the bottom of the water tank 1 for example.

Additionally, although description has been given as to the case where the reception devices 11a to 11c are arranged so as to form a regular triangle in the above embodiment, it is needless to say that the reception devices 11a to 11c do not have to be arranged so as to form a regular triangle.

Further, although description has been given as to the case where the three reception devices 11a to 11c are provided in the water tank 1 in the foregoing embodiment, a plurality of, e.g., four reception devices may be provided and three may be selected from these reception devices in accordance with the measurement state and the like. Then, the position measurement processing may be carried out by their reception signals. In this case, processing systems according to a number of the provided reception devices are provided to the propagation time clock generator 14, and signals are selected and processed by the personal computer 15. By adopting such a structure, even if an obstacle is arranged at a natatory position of the artificial fish 3 in the water tank 1, the reception signals of the reception devices which are not affected by the obstacle can be selected and the measurement processing can be effected, thereby assuredly performing the position measurement.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A natator in a water tank, comprising:
    a radio wave receiver for receiving a signal by radio waves transmitted from the outside;
    an ultrasonic transmitter for transmitting ultrasonic waves based n a signal received by said radio wave receiver; and
    a natatory operation servo motor which is controlled and driven in accordance with a signal received by said radio wave receiver.

2. The natator in a water tank according to claim 1, further comprising a battery for supplying power supply for operating said radio wave receiver, said ultrasonic transmitter and said natatory operation servo motor.

3. A control apparatus of a natator in a water tank, said control apparatus comprising:
    a natator which swims in a water tank;
    a radio wave transmitter for transmitting a control command by radio waves to said natator;
    a radio wave receiver which is provided to said natator and receives radio waves transmitted from said radio wave transmitter;
    an ultrasonic transmitter for transmitting ultrasonic transmission pulses by a control command received by said radio wave receiver;
    a reception device which is provided in said water tank and receives ultrasonic transmission pluses transmitted from said ultrasonic transmitter; and
    a control portion for transmitting a control command from said radio wave transmitter based on an ultrasonic reception signal received by said reception device.

4. The control apparatus of a natator in a water tank according to claim 3, further comprising a natatory operation servo motor which is driven and controlled in accordance with a control command received by said radio wave receiver.

5. A position measurement apparatus of a natator in a water tank, said position measurement apparatus comprising:
    a natator which swims in a water tank;
    a radio wave transmitter for transmitting a transmission command by radio waves to said natator;
    a radio wave receiver which is provided to said natator and receives radio waves transmitted from said radio wave transmitter;

an ultrasonic transmitter for transmitting ultrasonic transmission pulses by a transmission command received by said radio wave receiver;

at least three reception devices which are provided in said water tank and receive ultrasonic transmission pulses transmitted from said ultrasonic transmitter;

a propagation time measurement portion for measuring an ultrasonic wave propagation times from said ultrasonic transmitter to said respective reception devices based on a transmission monitor signal outputted from said radio wave transmitter and ultrasonic reception signals received by said respective reception devices; and a position calculation portion for calculating a three-dimensional position of said natator from respective propagation times of ultrasonic waves measured by said propagation time measurement portion.

6. The position measurement apparatus of a natator in a water tank according to claim 5, wherein said propagation time measurement portion selects three reception devices from said at least three reception devices based on a reception state of said ultrasonic pulses, and measures said ultrasonic wave propagation times from said ultrasonic transmitter to said respective reception devices based on said transmission monitor signal outputted from said radio wave transmitter and said ultrasonic reception signals received by said selected three reception devices.

7. The position measurement apparatus of a natator in a water tank according to claim 5, wherein a number of said reception devices is three and said three reception devices are provided at set positions at substantially equal water depths from the surface of water in said water tank and provided in such a manner that distances between said respective set positions become substantially equal.

8. The position measurement apparatus of a natator in a water tank according to claim 5, wherein said each reception device comprises:

an ultrasonic reception device for receiving ultrasonic transmission pulses transmitted from said ultrasonic transmitter; and a reception amplifier from amplifying ultrasonic transmission pulses received by said ultrasonic reception device and transmitting them to said propagation time measurement portion as said ultrasonic reception signal.

9. The position measurement apparatus of a natator in a water tank according to claim 5, wherein said each reception device is provided under the water in said water tank.

10. A position measurement apparatus of a natator in a water tank, said position measurement apparatus comprising:

a natator which swims in a water tank;

a radio wave transmitter for transmitting a transmission command by radio waves to said natator;

a radio wave receiver which is provided to said natator and receives radio waves transmitted from said radio wave transmitter;

an ultrasonic transmitter for transmitting ultrasonic transmission pulses by a transmission command received by said radio waver receiver;

at least three reception devices which are provided in said water tank and receive ultrasonic transmission pulses transmitted from said ultrasonic transmitter;

a propagation time clock generation portion which operates by detecting a transmission command in a transmission monitor signal outputted from said radio wave transmitter, and generates propagation time clock pulses whose number corresponds to ultrasonic propagation times from said ultrasonic transmitter to said respective reception devices;

a pulse counter for counter each propagation time clock pulse outputted from said propagation time clock generation portion;

a propagation time calculation portion for calculating an ultrasonic wave propagation time from said ultrasonic transmitter to each reception device from a pulse count value of said pulse counter; and a position calculation portion for calculating a three-dimensional position of said natator from each ultrasonic wave propagation time calculated by said propagation time calculation portion.

11. The position measurement apparatus of a natator in a water tank according to claim 10, wherein said propagation time clock generation portion selects three reception devices from said at least three reception devices based on a reception state of said ultrasonic wave pulses, and respectively generates propagation time clock pulses whose number corresponds to ultrasonic wave propagation times from said ultrasonic transmitter to said three reception devices.

12. The position measurement apparatus of a natator in a water tank according to claim 10, wherein a number of said reception devices is three, and said three reception devices are provided at set positions at substantially equal depths from the surface of water in said water tank and are provided in such a manner that distances between said respective set positions become substantially equal.

13. The position measurement apparatus of a natator in a water tank according to claim 10, wherein said each reception device comprises:

an ultrasonic reception device for receiving ultrasonic transmission pulses transmitted from said ultrasonic transmitter; and a reception amplifier for amplifying ultrasonic transmission pulses received by said ultrasonic reception device and transmitting them to said propagation time measurement portion as said ultrasonic reception signal.

14. The position measurement apparatus of a natator in a water tank according to claim 10, wherein said each reception device is provided under the water in said water tank.

15. The position measurement apparatus of a natator in a water tank according to claim 10, wherein said position calculation portion for calculating a three-dimensional position of said natator obtains a three-dimensional position of said natator by creating a data table showing the relationship between ultrasonic wave propagation times and a three-dimensional position of said natator in advance and comparing said ultrasonic wave propagation times calculated by said propagation time calculation portion with said data table.

16. The position measurement apparatus of a natator in a water tank according to claim 10, further comprising a storage portion for storing said data table created by said position calculation portion in advance, wherein said position calculation portion obtains a three-dimensional position of said natator by comparing said ultrasonic wave propagation time calculation portion with said data table stored in said storage portion.

* * * * *